United States Patent Office
3,661,972
Patented May 9, 1972

1

3,661,972
PURIFICATION OF HIGH BOILING ESTERS
Paul Biarnais, Melle, France, assignor to Melle-Bezons, Melle, Deux-Sevres, France
Filed Feb. 14, 1969, Ser. No. 799,298
Claims priority, application France, Feb. 26, 1968, 478
Int. Cl. C07c 69/06, 69/80
U.S. Cl. 260—468 R
17 Claims

ABSTRACT OF THE DISCLOSURE

A process for purification of high boiling esters produced by the esterification of an alcohol with a carboxylic acid or anhydride in the presence of sulfuric acid wherein the raw esterification product is subject to reaction with water for hydrolyzation of the alkyl hydrogen sulfate produced by the reaction of sulfuric acid with alcohol whereby the products of the hydrolyzation are easily separated from the reaction product.

---

Figure 1:
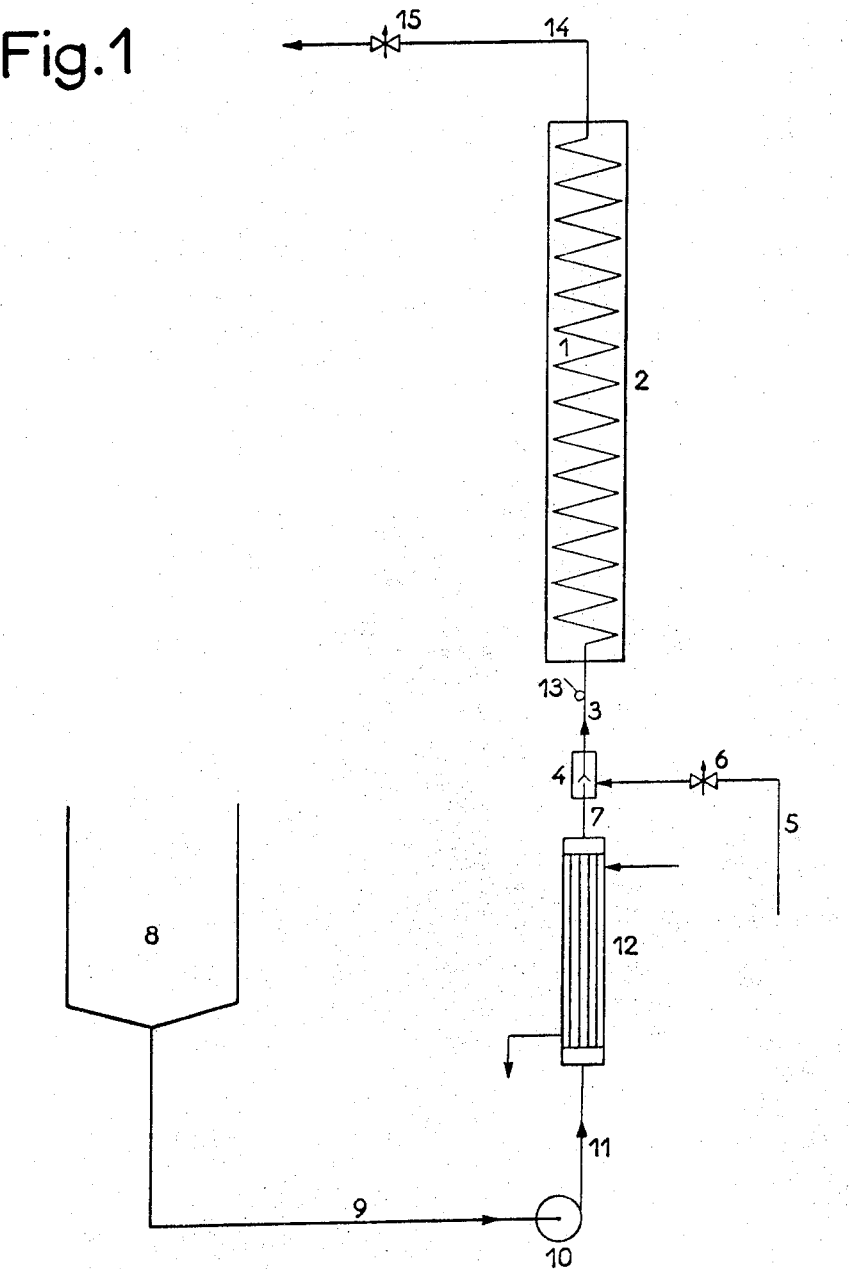

The present invention relates to a process for purifying high boiling esters which are primarily those usable as plasticizers or lubricants. It relates more particularly to the preparation of esters derived from monoacids or polyacids, such as aromatic or aliphatic dicarboxylic, tricarboxylic or tetracarboxylic acids, for example, phthalic acid, 2-ethyl hexanoic, adipic, sebacic, azelaic, trimellitic, and cyclopentane tetracarboxylic acids or their corresponding anhydrides, and aliphatic monohydric alcohols, such as butanol, 2-ethyl hexanol, decanols and tridecanols.

In most cases, the high boiling ester is obtained through esterification of the alcohol with the acid or anhydride in the presence of sulfuric acid as the catalyst. Excess alcohol is used so that the esterification of the carboxylic acid will be practically complete. The reaction mixture, at the end of the esterification reaction, is still acid and its acidity is due primarily to the presence of alkyl hydrogen sulfate which results from partial esterification of the sulfuric acid by the alcohol.

The conventional treatment of the raw mixture produced by the esterification reaction comprises neutralization followed by a water wash. The neutralization operation is performed by means of an alkaline reagent, usually sodium hydroxide or sodium carbonate. The alkaline hydrogen sulfate, thus directly neutralized, gives an alkyl alkali metal mixed sulfate which is subsequently discarded in the aqueous wash liquid of the ester.

By such treatment, the alcohol combined with the sulfuric acid, as mixed sulfate, is lost since it is not economically recoverable. This loss, which depends directly upon the amount of catalyst employed, can exceed 1.5% of the amount of alcohol converted into the desired ester.

Another inconvenience results from the fact that the alkyl alkali metal mixed sulfate is generally a tensioactive and emulsifying agent, especially when the metal is sodium and the alkyl radical contains a high number of carbon atoms, as when the plasticizer ester is derived from $C_8$ and higher alcohols. This property of the mixed sulfate is unfavorable to the separation by decantation necessitated by the neutralization and water washing operations of the ester. It results in losses of valuable products in emulsified form and slows the separation of the organic and aqueous phases by decantation.

Furthermore, the alkyl alkali metal mixed sulfate, even in trace amounts, is highly detrimental to the dielectric quality of the high boiling ester, which characteristic is usually demanded of plasticizer esters. The presence of

2 traces of mixed sulfate results in poor resistivity of the high boiling ester. In this respect, the mixed sulfate becomes more detrimental as it is more tensioactive, i.e., as the number of carbon atoms increases, it becomes more difficult to remove.

In addition, at slightly higher amounts, the mixed sulfate causes instability and decomposition of the plasticizer ester in response to heat to which it is exposed during the preparation operations of the plastic materials formulated with such plasticizer.

An object of this invention is to allow decomposition to be effected of the alkyl hydrogen sulfate present in the raw mixture from the esterification reaction of an acid or anhydride by an alcohol in the presence of sulfuric acid as previously described.

These and other objects and advantages of this invention will hereinafter appear and for purposes of illustration, but not of limitation, embodiments of the invention are shown in the accompanying drawings, in which—

Figure 2:
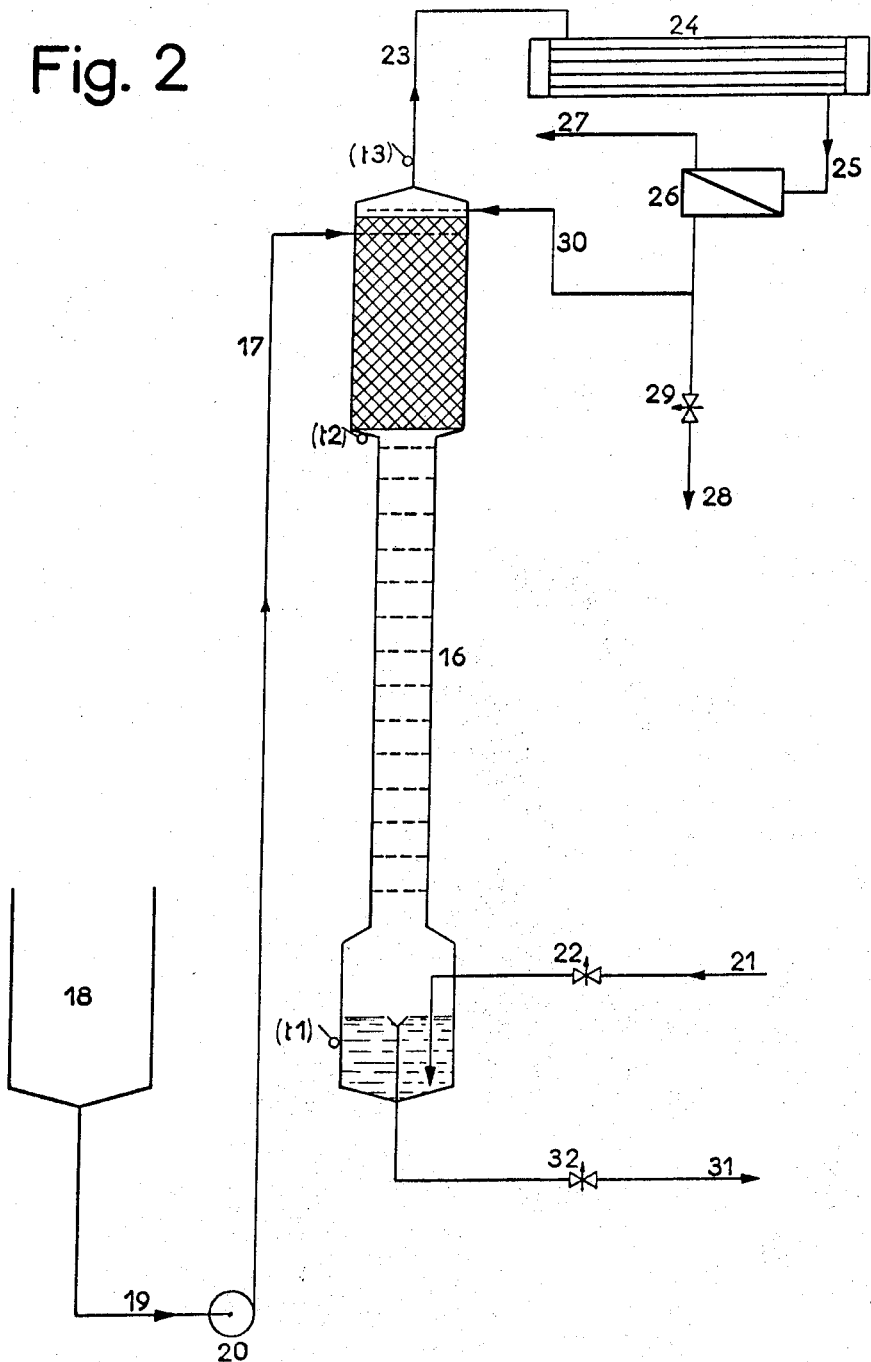

FIG. 1 is a schematic diagram of apparatus which may be employed for carrying out the practice of this invention, and FIG. 2 is a schematic diagram of a modification in the apparatus which may be employed in the practice of this invention.

In accordance with the practice of this invention, the alkyl hydrogen sulfate is hydrolyzed by heating in the presence of water prior to the conventional neutralization treatment and water wash of the ester.

Treatment in accordance with the invention operates to convert the alkyl hydrogen sulfate back to sulfuric acid and alcohol, giving rise to a sulfuric aqueous phase. This phase can be separated from the ester phase by decantation or it can be directly neutralized in the presence of the ester phase. In the latter instance, there is formed an alkali metal neutral sulfate which, instead of causing formation of an emulsion, favors the decantation. This neutral sulfate is easily removed in the form of an aqueous solution. Furthermore, in low concentrations, it has practically no influence on the electrical resistivity or heat stability of the ester.

Thus, in accordance with the practice of this invention, the loss of alcohol, corresponding to the amount of alkyl hydrogen sulfate, is at least largely avoided, which practically amounts to avoiding formation of alkyl alkali metal mixed sulfate. Accordingly, the losses of products through emulsification and the losses of time during operation are avoided or at least substantially reduced. Furthermore, the process of the invention generally insures plasticizer esters of higher heat stability and higher resistivity when used as a dielectric.

In actual practice, the process of the invention may be carried out simply by bringing the raw esterification product, containing the alkyl hydrogen sulfate to be destroyed, into intimate contact with water at suitable temperature for a suitable time. Preferably the amount of water with respect to the organic phase is greater than 1% by volume but not more than 50% by volume and preferably within the range of 2–15% by volume. The process is preferably carried out at a temperature within the range of 80° to 150° C. under an absolute pressure within the range of about 300 millimeters of mercury to about 10 bar. Under such conditions, the hydrolysis of the alkyl hydrogen sulfate is generally realized up to a rate of 85% to 100% within a reaction time in the range of about 10 seconds to about 90 minutes. It is then sufficient to cause the intimate contact to cease and the aqueous phase, which contains practically all of the sulfuric acid liberated by the hydrolysis reaction, easily separates from the ester phase or organic phase by mere decantation. The distribution coefficient which is the ratio $$\frac{\text{sulfuric acid concentration in the aqueous phase}}{\text{sulfuric acid concentration in the ester phase}}$$

is at least 15:1 and can even be above 40:1. The low acidity remaining in the separated ester phase can thereafter be neutralized by conventional techniques without any difficulty. However, as previously described, it is also possible and often easier to neutralize both phases together.

Operating with a small amount of water, for example in the order of 2% by volume, it is possible to obtain an aqueous phase having a relatively high concentration of sulfuric acid, which can be as high as about 25% by weight. This sulfuric aqueous phase may then be directly returned to the esterification zone to reduce the flow of acid- or salt-containing effluents.

Generally, a hydrolysis rate of about 80% of the alkyl hydrogen sulfate is sufficient practically to avoid decantation difficulties and losses through emulsification, even in especially delicate instances, such for example as in the case of decyl or higher esters. The process of the invention allows this hydrolysis rate of the alkyl hydrogen sulfate to be materially exceeded without substantial hydrolysis of the desired carboxylic ester.

Besides efficient means for insuring the intimate contact between the liquid phases, the apparatus to be employed should be formed of materials that withstand corrosion by the very hot aqueous sulfuric acid medium.

The process of the invention may be carried out as a batch operation or as a continuous operation. For batchwise operation, one may, for example, operate with an apparatus of the Grignard type having an inner lining of lead, glass or enamel and provided with conventional means for stirring, heating, distilling, condensing vapors, refluxing a portion of the condensate and withdrawing the remainder. The substances that distill off during the operation are water and organic liquids formed mainly of the excess alcohol from the esterification reaction and the water entrained during the esterification. These organic liquids and water may be partly withdrawn and partly refluxed.

The continuous operation can advantageously be carried out in a reactor through which the reactants, the raw ester and water, are passed co-currently and counter-currently while being maintained by conventional techniques in intimate contact one with the other under the desired operating conditions, as will hereinafter be described.

In the apparatus shown in FIG. 1, the reactor comprises a column 2 enlcosed within a heating jacket or otherwise lined with a layer of efficient heat insulating material 2, with a coil 1 preferably formed of lead or glass extending lengthwise therethrough. Water and raw esterification product, intimately mixed in the mixer 4, is fed through line 3 to the lower end of the coil 1. Hot water is fed, with or without pressure, to the mixer 4 through pipe 5 fitted with a control valve 6 for regulating the rate of flow of water. The raw esterification product, formed in the esterification column 8, is withdrawn from the bottom of the column into pipe 9 and pumped by the pumping means 10 through line 11 to a heat exchanger 12 and then through line 7 to the mixer 4. In the heat exchanger 12, the raw esterification product can be either cooled or heated, as required, to the desired reaction temperature, as measured by a thermometer 13 downstream of the mixer 4.

The mixer provides the emulsion of the aqueous and ester phases. This emulsion should be maintained throughout the stream passing through the coil of the reactor, such as by maintaining a flow rate through the reactor sufficient to provide a turbulent state. The required speed depends somewhat upon the diameter of coil 1 and the residence time required for the liquids in the reactor.

The products issue from the reactor through pipe 14 which is provided with a control and/or release valve 15 for distribution thereof either to cooling and decantation or to neutralization.

The described apparatus is subject to considerable variation without departing from the spirit of the invention. It is essential, however, that it be formed of materials capable of withstanding the hot aqueous sulfuric acid and capable of providing intimate contact between the liquid phases at a suitable flow rate. Thus, instead of a narrow coil 1, use can be made of a cylinder packed with packing materials such as rings of glass or stoneware, quartzite sand, lead grains and the like. The reactor may also be modified to receive the reactants at its upper end portion instead of the lower end portion for downward flow through the reactor. Also, it is not necessary to arrange the reactor vertically but instead it may be disposed horizontally or at angles in between.

The apparatus descirbed may be operated under pressure. It is preferred to operate under pressure sufficient to prevent the liquid phases from vaporizing at the operating temperature.

In the apparatus of FIG. 2, the reactor is in the form of a distillation column 16. This column may be bubble-plate column or a packed tower, or preferably, as represented in FIG. 2, a column comprising both a bubble-plate zone and a packed zone. When a packed zone is employed, it is preferably located in the upper portion of the column and serves to facilitate rapid separation of water entrained during the esterification reaction which comes off at the top. In such instance, the portion of the column that contains the plates operates to treat a mixture the organic phase of which consists essentially of carboxylic ester and possibly excess alcohol.

Raw ester from the lower portion of the esterification column is fed through line 19 and pumped by the pump means 20 through line 17 to the upper end of the distillation column 16. Live steam is introduced through line 21 fitted with a valve 22, into the lower portion of the distillation column 16.

A continuous operation with concurrent distillation is achievved which allows the water entrainer and all or part of the excess alcohol, employed during esterification, to be directly removed while providing intimate contact between the two liquid phases on the bubble-plates or within the packing.

The vapors are withdrawn from the head of the column through pipe 23 and introduced into a condenser 24. The condensate liquids are transmitted through line 25 to a decanter 26. The upper layer, which consists of water entrainer and possibly all or part of the excess alcohol, is withdrawn through pipe 27. The lower aqueous layer is withdrawn through line 28 and subdivided by the valve 29 for transmission of a portion through line 30 to the upper end of the column 16 for reflux while the remainder continues through line 28. In the operation carried out in a distillation column, the ratio of the aqueous phase to the ester phase is preferably about 5% by volume. The desired ratio is easily controlled by control of the amount of aqueous layer removed from the decanter through pipe 28 with the remainder being refluxed to the column 16, as previously described.

The desired ester and the sulfuric acid aqueous solution produced by the hydrolysis of the alkyl hydrogen sulfate are withdrawn from the base of the column through pipe 31 provided with a control valve 32.

Finally, $t_1$, $t_2$ and $t_3$ represent thermometers for reading the temperatures at the base, on the last plate, and in the head vapors.

The column, the plates and packing are made of materials that are not subject to attack by the hot aqueous sulfuric acid. For this purpose, use can be made of such materials as lead, glass, stoneware, Teflon, graphite or steel clad with one of the aforementioned substances.

The following examples are given by way of illustration, but not by way of limitation, of the practice of this invention:

EXAMPLE 1

In a Grignard type apparatus equipped as aforesaid, there is treated batchwise a raw product resulting from an esterification reaction for the production of di-n-butyl phthalate in which the product has the following composition, by weight:

| | Percent |
|---|---|
| Di-n-butyl phthalate | 55.0 |
| n-Butanol (containing traces of di-n-butyl ether) | 44.45 |
| n-Butyl hydrogen sulfate | 0.55 |

The acidity of this product is 0.0357 equivalents per kg.

For carrying out the treatment, the above mixture is heated in the apparatus with water, under atmospheric pressure and with stirring, while maintaining a smooth boiling. Table I below gives the results of two experiments (1 and 2).

EXAMPLE 2

In the apparatus of Example 1, there is treated batchwise a raw product resulting from an esterification reaction for the production of di(2-ethyl hexyl) phthalate, in which the product has the following composition, by weight:

| | Percent |
|---|---|
| Di(2-ethyl hexyl) phthalate | 80 |
| 2-ethyl hexanol | 6.4 |
| Cyclohexane (water entrainer) | 12.4 |
| 2-ethyl hexyl hydrogen phthalate | 0.15 |
| 2-ethyl hexyl hydrogen sulfate | 1.05 |

The operation is carried out as described in Example 1. The boiling temperature is adjusted to the desired value either through the addition (for a temperature of 89–91° C.) or through the removal (for a temperature of 100–103° C.) of a small amount of cyclohexane.

Table I below gives the results of six experiments, identified as experiments 3–8.

EXAMPLE 3

In the apparatus of Example 1, there is treated batchwise a raw product resulting from an esterification reaction for the production of di(3,5,5-trimethyl decyl) phthalate, in which the product has the following composition, by weight:

| | Percent |
|---|---|
| Di(3,5,5-trmethyl decyl) phthalate | 80.67 |
| 3,5,5-trimethyl decanol | 6.1 |
| Cyclohexane | 11.9 |
| (3,3,5-trimethyl decyl) hydrogen phthalate | 0.05 |
| (3,3,5-trimethyl decyl) hydrogen sulfate | 1.28 |

The operation is carried out as in Example 2, except that in the last experiment (No. 14), instead of atmospheric pressure, use is made of an effective pressure of 2.1 to 2.7 bar to reach a higher temperature.

Table I below gives the results of six experiments, identified as experiments 9–14.

EXAMPLE 4

In the apparatus of Example 1, there is treated batchwise a raw product resulting from an esterification reaction for the production of 1-ethyl hexyl 2-ethyl hexanoate, in which the product has the following composition, by weight:

| | Percent |
|---|---|
| 2-ethyl hexyl 2-ethyl hexanoate | 78.3 |
| 2-ethyl hexanol | 7.96 |
| Cyclohexane | 12.3 |
| Free, unconverted 2-ethyl hexanoate acid | 0.06 |
| (2-ethyl hexyl) hydrogen sulfate | 1.38 |

The operation is carried out as in Example 2. Table II below gives the results of three experiments.

EXAMPLE 5

An operation is carried out continuously in an apparatus such as represented in FIG. 1 of the drawing, except that the reactor, instead of being a coil, is a vertical glass cylinder containing quartzite sand as a packing material taking up 57% of the total inner volume of the reactor. In this apparatus, there is treated the same raw esterification product as in Example 3, the apparatus being operated as disclosed above.

In a series of experiments, the operation temperature is varied while such pressures are used that the reaction mixture cannot evolve vapors in the reactor. The phase ratio, $$\frac{\text{water}}{\text{raw product}}$$

and the residence time in the reactor are also varied. The residence time is defined as the ratio V:FR in which V is the total inner volume of the reactor and FR is the total flow rate of the mixture of the two phases, all the values being calculated as at a temperature of 20° C.

The determination and analyses are effected on an average sample of the emulsion, taken off at a time more than 20 minutes and after several hours running of the apparatus at equilibrium at the fixed working speed.

Table III below gives the results of nine experiments, identified as experiments 18–26. With regard to the last six experiments, only the extreme values of the operation parameters and results are given.

EXAMPLE 6

In the apparatus of Example 5, there is treated continuously the same raw esterification product as in Example 2; a series of experiments were carried out in which the temperature, pressure, ratio of the phases and residence time are varied.

Table III below gives the results of seven experiments, identified as experiments 27–33.

EXAMPLE 7

An operation is carried out continuously in an apparatus such as represented in FIG. 2 of the drawing. The body of column 16 is made of glass. The upper portion of the column which is 75 millimeters in diameter and 75 centimeters in height contains a packing of glass Raschig rings in the middle portion which is 50 millimeters in diameter and 1.1 meters in height. It contains 10 perforated plates made of polytetrafluoroethylene. The base portion of the column is a glass balloon having a capacity of 4 liters, almost half full of liquid. In this apparatus, there is treated the same raw esterification product as in Example 2.

The operation conditions are as follows:

Feed rate of the raw product through pipe 17: 5.5 liters per hour

Feed rate of steam at 100° C. through pipe 21: 2.05 kg. per hour

Withdrawal of aqueous layer through pipe 28: 1.47 liters per hour

Withdrawal of (cyclohexane+2-ethyl hexanol) layer through pipe 27: 0.84 liters per hour Withdrawal of water through pipe 31: 0.58 liter per hour Withdrawal of ester (phthalate) through pipe 31: 4.66 liters per hour Base temperature ($t_1$): 101° C.

Upper plate temperature ($t_2$): 98°–99° C.

Top temperature ($t_3$): 96.5°–97° C.

Total residence time of the liquids on the ten plates, about: 9 minutes

Total residence time of the liquids in the balloon, about: 21 minutes

After several hours running at the equilibrium, samples of the ester phase and aqueous phase are taken off through pipe 31. Analysis of these samples shows that the hydrolysis rate of the (2-ethyl hexyl) hydrogen sulfate is above 95% and that the di(2-ethyl hexyl) phthalate loss through hydrolysis is below 0.025%.

TABLE I

| Experiment No. | Temperature (° C.) | Ratio, water / raw product (percent) | Residence time— To reach the desired temperature (minutes) | Residence time— At the desired temperature (minutes) | Hydrolysis rate of— The alkyl hydrogen sulfate (percent) | Hydrolysis rate of— The phthalate ester (percent) |
|---|---|---|---|---|---|---|
| 1 | 92–99 | 2.7 | 5 | 5 | 75 | |
|   |   |   | 5 | 15 | 82 | |
|   |   |   | 5 | 30 | #100 | #0.03 |
|   |   |   | 5 | 60 | 100 | #0.26 |
| 2 | 95–98 | 10 | 6 | 0 | 68 | |
|   |   |   | 6 | 25 | 80 | |
|   |   |   | 6 | 60 | 90 | |
|   |   |   | 6 | 120 | 99 | 0.03 |
| 3 | 89–91 | 10 | 5 | 15 | 58.5 | 0.03 |
| 4 | 100–103 | 2 | 6 | 15 | 81 | 0.35 |
| 5 | 100–103 | 5 | 6 | 15 | 94.3 | 0.12 |
| 6 | 100–103 | 10 | 6 | 15 | 97.5 | 0.08 |
| 7 | 100–103 | 20 | 6 | 15 | 96 | 0.05 |
| 8 | 100–103 | 10 | 6 | 25 | 99.6 | 0.08 |
| 9 | 80 | 10 | 4 | 2 | 18 | |
|   |   |   | 4 | 17 | 75 | |
|   |   |   | 4 | 30 | 84 | |
|   |   |   | 4 | 90 | #90 | |
| 10 | 94–96 | 10 | 5 | 3 | 25 | |
|    |       |    | 5 | 7 | #80 | |
|    |       |    | 5 | 15 | #84 | |
|    |       |    | 5 | 30 | 86 | |
|    |       |    | 5 | 60 | 90 | 0.05 |
|    |       |    | 5 | 120 | 90.5 | ≤0.12 |
| 11 | 94–96 | 5 | 5 | 30 | 86.3 | |
|    |       |   | 5 | 90 | 90 | 0.15 |
| 12 | 94–96 | 20 | 5 | 30 | 86.2 | |
|    |       |    | 5 | 90 | 90 | 0.10 |
| 13 | 100–103 | 10 | 5 | 8 | 87.9 | 0.08 |
|    |         |    | 5 | 30 | 88.5 | |
|    |         |    | 5 | 60 | 90.3 | 0.10 |
| 14 | 114–120 | 10 | 9 | 5 | 95 | 0.135 |

TABLE II

| Experiment No. | Temperature (° C.) | Ratio, water / raw product (percent) | Residence time— To reach the desired temperature (minutes) | Residence time— At the desired temperature (minutes) | Hydrolysis rate of— The alkyl hydrogen sulfate (percent) | Hydrolysis rate of— The 2-ethyl hexanoate ester (percent) |
|---|---|---|---|---|---|---|
| 15 | 80–83 | 10 | 5 | 15 | 22.4 | 0.008 |
| 16 | 90–92 | 10 | 6 | 15 | 77.3 | 0.015 |
| 17 | 100–101 | 10 | 6 | 15 | 99.77 | 0.023 |

TABLE III

| Experiment No. | Temperature (° C.) | Effective pressure (kg./cm.²) | Total flow rate (FR)[1] | Total residence time | Ratio, water / raw product (percent) | Hydrolysis rate of— The alkyl hydrogen sulfate (percent) | Hydrolysis rate of— The phthalate ester (percent) |
|---|---|---|---|---|---|---|---|
| 18 | 116 | 2.6 | 1.94 | 6 minutes, 42 seconds | 12.2 | 99 | <0.01 |
| 19 | 120 | 2.9 | 3.48 | 3 minutes, 45 seconds | 15 | #100 | 0.05 |
| 20 | 127 | 3.9 | 7.60 | 1 minute, 43 seconds | 6.6 | 100 | ≤0.02 |
| 21–26 | 132–134 | 5 | 10.4–13 | 1 minute, 15 seconds to 1 minute. | 6.6–7.2 | 95–100 | 0.02–0.04 |
| 27 | 125 | 5 | 10.9 | 1 minute, 12 seconds | 5 | 87 | |
| 28 | 135 | 6 | 11.05 | 1 minute, 11 seconds | 1.94 | 94 | 0.03 |
| 29 | 135 | 6 | 11.65 | 1 minute, 7 seconds | 5.2 | 94 | ≤0.008 |
| 30 | 135 | 6 | 11.05 | 1 minute, 11 seconds | 8 | 97 | 0.003 |
| 31 | 135 | 6 | 11.05 | do | 10.8 | 95 | |
| 32 | 135 | 6 | 11.05 | do | 12.6 | 80 | 0.003 |
| 33 | 135 | 6 | 11.05 | do | 20 | 35 | |

[1] Liters per hour per cm.² of cross-section of the reactor.

The pressures are measured at the exit from the reaction cylinder.

I claim:
1. A process for purification of high boiling esters produced by esterification of an excess alkanol containing 4 or more carbon atoms with a carboxylic acid selected from the group consisting of phthalic acid, 2-ethylhexanoic acid, adipic acid, sebacic acid, azelaic acid, trimellitic acid and cyclopentane tetracarboxylic acid and their anhydrides in the presence of sulfuric acid, comprising heating the raw esterification mixture consisting essentially of the ester, unreacted alcohol and the corresponding alkyl hydrogen sulfate in the presence of water before any subsequent treatment to neutralize or water wash the high boiling ester, to hydrolyze the alkyl hydrogen sulfate that is formed in the raw esterification mixture by the reaction of sulfuric acid with alcohol.

2. A process as claimed in claim 1 in which the alkyl hydrogen sulfate is reconverted by hydrolyzation to alcohol and sulfuric acid.

3. A process as claimed in claim 1 in which the raw esterification mixture is maintained in intimate contact with the water while being heated.

4. A process as claimed in claim 1 in which the amount of water with respect to the organic phase is within the range of 1–50% by volume.

5. A process as claimed in claim 1 in which the amount of water with respect to the organic phase is within the range of 2–15% by volume.

6. A process as claimed in claim 1 in which the raw esterification mixture is heated to a temperature within the range of 80–150° C.

7. A process as claimed in claim 1 in which the heating step is carried out under absolute pressure within the range of 300 millimeters of mercury to about 10 bar.

8. A process as claimed in claim 1 in which the heating step is carried out for a time within the range of 10 seconds to 90 minutes.

9. A process as claimed in claim 1 in which the heating step is carried out as a continuous operation in a reactor through which the reactants are passed unidirectionally or counter-currently.

10. A process as claimed in claim 1 in which the materials are maintained in intimate contact by passage through the reactor under turbulent flow.

11. A process as claimed in claim 9 in which the reactor is operated under pressure sufficient to avoid evolution of vapors from the liquid mixture at operating temperature.

12. A process as claimed in claim 9 in which the reaction zone is in the form of a column having a lower bubble-plate portion and an upper portion packed with packing material.

13. A process as claimed in claim 1 in which the aqueous phase is separated by decantation from the ester phase after the hydrolysis reaction.

14. A process as claimed in claim 13 which includes the step of neutralizing the ester phase after separation from the aqueous phase.

15. A process as claimed in claim 13 in which the amount of water with respect to the organic phase is 2% by volume, and in which the separate aqueous sulfuric phase is recycled to the esterification step.

16. A process as claimed in claim 1 which includes the step of neutralizing the aqueous sulfuric phase while in admixture with the ester phase after the hydrolysis reaction.

17. A process as claimed in claim 13 in which the amount of aqueous phase with respect to the ester phase is maintained at about 5% by volume by refluxing a portion of the separated aqueous phase to the top of the column.

References Cited
UNITED STATES PATENTS

| | | | |
|---|---|---|---|
| 1,979,516 | 11/1934 | Wilson | 260—492 |
| 2,459,014 | 1/1949 | Cavanaugh et al. | 260—475 |
| 2,975,209 | 3/1961 | Bos et al. | 260—475 |

LORRAINE A. WEINBERGER, Primary Examiner

E. J. SKELLY, Assistant Examiner

U.S. Cl. X.R.

260—475 B, 485 S, 499